July 14, 1970      E. K. CASKEY      3,520,109
DUST COLLECTOR IMPROVEMENT
Filed Sept. 12, 1968
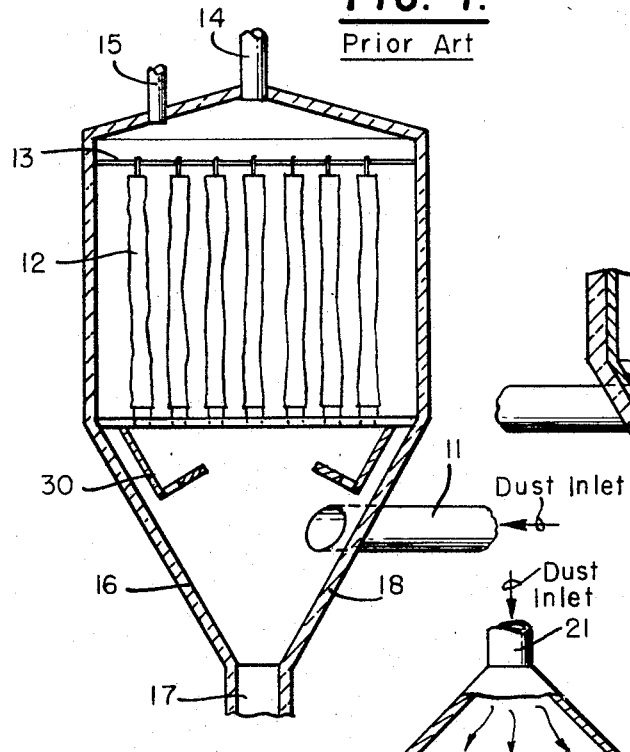
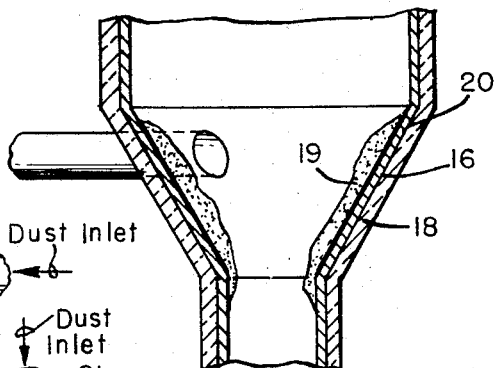
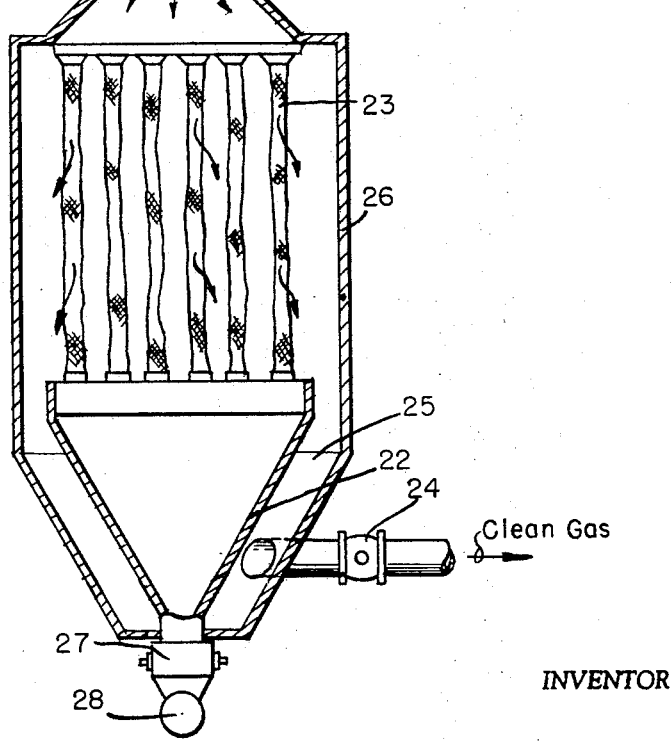
INVENTOR
BY
ATTORNEY

United States Patent Office 3,520,109
Patented July 14, 1970

---

3,520,109
DUST COLLECTOR IMPROVEMENT
Eddie K. Caskey, Houston, Tex., assignor to Ashland Oil & Refining Company, Houston, Tex., a corporation of Kentucky
Filed Sept. 12, 1968, Ser. No. 759,417
Int. Cl. B01d 46/04
U.S. Cl. 55—96                    6 Claims

ABSTRACT OF THE DISCLOSURE

An improved method and apparatus for collecting carbon black or separating finely divided solids that are entrained in a gaseous stream. More specifically, after hot gaseous effluent containing suspended carbon black is passed through a series of bag filters, the resultant clean gas continues along a generally parallel path to completely surround and heat the collection hopper for the previously entrained carbon black. The use of the high temperature clean gas to maintain the temperature of the collection hopper above the dew point of the atmosphere within the collection hopper prevents the formation of condensate therein, and the resultant caking and corrosion associated therewith.

BACKGROUND OF THE INVENTION

Most carbon blacks are formed by pyrolytic cracking of a normally liquid hydrocarbon fed into a reactor. The feed hydrocarbon is contacted with a hot surface or with hot combustion gases of fuel and oxygen-bearing gas, generally natural gas and air. In such processes, the feed hydrocarbon dissociates into carbon black particles suspended in intensely hot effluent gases, generally ranging in temperature from 2000° to 4000° F. Because of the extremely high temperature of the effluent gases, it is generally the practice to cool them to a substantially lower temperature, e.g. 250° to 800° F., before removal of the carbon black. Quite commonly, the cooling is done by injection of sprayed water into the gaseous suspension of carbon black in a water quenching zone in the carbon black reactor.

Combustion or partial combustion of the hydrocarbon and the fuel inherently produces some water which appears in the reactor effluent as water vapor along with the large additional quantities of cooling water added to the reactor effluent. Their combined effect is to complicate the filtering and recovering of the carbon black from the gaseous effluent, especially when employing bag filters for separation and recovery of the carbon black.

Generally, in manufacturing carbon black, the moisture-laden off gas from a reactor, or a plurality of reactors, is passed through filters of a fabric or bag type, normally consisting of a plurailty of compartments. The filter bags are ordinarily made of fabric of one type or another. Such natural fabrics as for example wool or fabrics woven from some synthetic fiber, such as orlon, present serious problems in cooling the carbon black, inasmuch as the gases containing the carbon black must be cooled to a temperature of somewhere between 250° and 300° F. to prevent damage to the natural or synthetic fibers. Recently, fabrics utilizing woven glass have been utilized, and a glass fabric bag can be operated at temperatures up to 600° F., although the general operating temperature is approximately 525° F. Each of the bag filter units has a plurality of long filter bags provided with inlet and outlet means for conveying the gases through the compartments and through the filter bags. The suspended black is thereby removed from the effluent gas, and the clean gas is then withdrawn from the compartment.

In operation, the gaseous effluent may enter the filter bags from either the top or the bottom. Generally speaking, the heavier dust particles go directly to the hopper located below the collection bags. The lighter dust or black in the bottom entry bag moves upward until it is removed from the effluent stream by the filter bag. In all of the bag filtering units, it is generally quite common to provide means for removing the cake of carbon black from the filter bags. The means include reversal of the gas processing streams, agitation of the bags, sonic vibrations and air pulses. During the removal operation, the collected black falls to the hopper below.

The carbon black at this stage is very fluffy with some grades of the carbon black exhibiting apparent densities little greater than the gases from which they are being separated. Depending upon the type of black that is being processed, and the many variables that enter into the manufacture of carbon black, the black will be more or less sticky. The problem of carbon black sticking is accentuated by any condensate that forms as a result of the cooling process, or as a result of the gas or the black coming into contact with a cold metal surface. The collection hoppers now being employed are generally covered over their exterior surfaces with insulating material in an attempt to maintain the metal surface within the hopper at a temperature above the ejection point of the carbon black being processed. If this temperature is not maintained, carbon black will cake along the inner walls of the hopper until it chokes off or restricts the output of the hopper entirely.

In addition to the problem of excess caking, the carbon black cake will trap and collect moisture between the cake and the metal surface of the hopper and will substantially increase the corrosion rate of the metal. Various types of metals have been tried to resist this corrosion, including stainless steel, but to little avail. Particularly the lower 18 inches of the hopper of a carbon black collector hopper is subjected to this increased corrosion and deterioration.

Due to the tremendous amount of water vapor present in the effluent gas, it is particularly desirable to prevent the formation of condensate wherever possible. As pointed out, the presence of condensate in the hopper cone causes two basic problems: the excess caking of carbon black that restricts the hopper output, and the increased deterioration or corrosion of the hopper surface due to the interaction of the carbon black and the condensate on the hopper surface.

SUMMARY OF THE INVENTION

It is therefore an object of the present invention to prevent the formation of condensate within the collection hopper of a bag filter type of carbon black collector.

It is another object of the present invention to prevent the excess caking of the carbon black which would otherwise restrict the outlet opening of the carbon black collector hopper.

It is another object of this invention to provide a method of passing the clean gas around the collection hopper to insulate it from the outside air temperature and thereby elevate it to a temperature above the ejection point of the carbon black.

It is another object of this invention to provide a novel configuration for a carbon black collector bag house that will force the clean gas from the collector bags around the collection hopper, thereby maintaining it at an elevated temperature.

BRIEF DESCRIPTION OF THE DRAWING

In the drawing:
FIG. 1 is a sectional view of a prior art type of carbon black collector;

FIG. 2 is an enlarged sectional view of the lower part of a collection hopper subject to corrosion; and FIG. 3 is a sectional view of the novel configuration utilized in the present invention.

DETAILED DESCRIPTION OF THE PREFERRED EMBODIMENTS

FIG. 1 illustrates one form of the prior art type of carbon black collection filters. The hot gas effluent is brought in through input 11 and passes upwardly through a preseparator 30 and a plurality of filter bags generally designated at 12. Filter bags 12 are closed on their upper end and supported by means of a suitable support means 13 to maintain them in their extended position. Clean gas passes upward and outward through discharge opening 14 while the collected carbon black either falls through to hopper 16 or remains on the inner surface of the filter bags 12. Stack 15 is for repressuring the bags to dislodge the carbon black collected on the inner sides thereof. It should be noted that many types of dislodging apparatus are utilized in this type of construction, including such diverse means and methods as mechanical bag shakers, acoustic devices, i.e., horns and sirens, repressuring lines, and pulsed input and output lines. During the operation of the carbon black filter, the heavier particles of suspended carbon black fall directly to hopper 16 while the lighter particles are trapped on the inside of the filter bags. During the repressuring or dislodging cycle, these particles are shaken down into hopper 16 and are collected by conveyor 17.

It has been found through experience that many grades of carbon black are sticky within themselves and require no moisture to cause them to adhere to each other or to the collector surfaces. For other grades of carbon black, there appears to be an ejection point wherein at certain temperatures, the carbon black remains in a non-sticky state and will not adhere to the walls of the hopper or collector.

For virtually all types of carbon black, any condensate which forms within the hopper 16 will accelerate and accentuate the sticking or caking problem. This condensate is due to the tremendous volumes of water which result from the process of manufacture, and from the water sprays that are used to cool the black from 2300° F. to 250° or 800° F. As will be appreciated, as the temperature is lowered to the 250° to 800° F. range, the water content of the gaseous effluent may condense out as liquid water as the temperature drops below its dew point, causing droplets of water to form on hopper cone 16, thereby accentuating and accelerating the sticking problem. For these reasons, it is desirable to maintain the temperature of the hopper cone 16 at temperatures in excess of 250° F.

The current practice in the prior art is to heavily insulate the hopper cone as shown at 18, to thereby prevent the transfer of heat from the collector hopper surface to the surrounding atmosphere. As can readily be appreciated, if the temperature of the inner gases is at 300–400° F., and the temperature of the outside surface of the hopper is at 3–40° F. and subjected to a wind of 15 to 20 miles per hour, a great deal of heat will be transferred from the hopper surface.

As it can be appreciated, bringing relatively moisture laden effluent gas at a temperature of 400° F. into contact with the metal surface of the hopper cone that has been cooled considerably, e.g. to 200° F., will cause large amounts of condensate to form on the walls of the hopper cone. When the hopper cone is continually cooled by a low outside temperature and air convection, the problem becomes quite pronounced.

In the prior art, attempts have been made to reduce the formation of condensate within the hopper by bringing the hot gaseous effluent containing the carbon black in at as low a level as possible to heat the hopper cone surface, and by heavily insulating the hopper cone. These attempts have, to date, been singularly unsuccessful.

In addition, the turbulence generated by the effluent inlet will reentrain the carbon black that has settled in the hopper, or will tend to reentrain the heavier particles of carbon black that are settling out directly and thus decrease the efficiency of the carbon black collector. The lower the effluent inlet is located in the hopper cone, the greater the degree of turbulence and reentrainment. Unfortunately, the lower portions of the hopper cone have the greatest surface area-to-volume ratios, and are most subject to the cooling of the hopper cone by outside air. In practice, the lower 18 inches of this hopper cone are subject to greatly increased corrosion due to the formation of the carbon black cake as illustrated in FIG. 2, which traps the moisture and condensate between the carbon black and the metallic liner. Various types of metals have been tried here without success, including stainless steel. Due to the high temperatures and the inner-action of the carbon black with the condensate on the metallic surface, it is quite common for the lower 18 inches of the hopper cone to completely disintegrate within 18 months, requiring a replacement of the whole lower section of the bag house or the entire hopper cone.

In the prior art illustrated in FIG. 2, a carbon black cake 19 will form on the inner wall of hopper cone 16. This cake may be from ⅛ inch in thickness to many inches in thickness, depending on the type of black being processed. In certain types or grades of carbon black, it is not uncommon to have the cake build quite rapidly until the entire outlet of hopper cone 16 is blocked, thus necessitating a shut-down of this filter unit while the lower part of the hopper cone is cleaned. As previously mentioned, many factors contribute to this caking; among them, the type of black being produced, the air temperature of the atmosphere within the hopper cone, the temperature of the hopper cone itself, the degree of slope of vertical of the hopper cone, and the relative moisture levels both in the air that is water vapor, and on the walls of hopper 16, i.e., condensate. Once the cake begins to form, an area of corrosion 20 begins to form which will eventually destroy the lower part of hopper cone 16. It is currently the practice to provide heavy insulation 18 around the lower part of the hopper cone and although this insulation adds to the life of the hopper cone, it is impossible to economically insulate it to the extent required to completely eliminate the formation of condensate therein.

In the preferred embodiment of the present invention, a flow-through type of filter bag is used with the effluent inlet 21 at the upper end of the collection unit illustrated in FIG. 3. Open-ended bags are used and the entrained carbon black passes downwardly through the bags with the heavy particles falling directly to the hopper cone 22 with the lighter particles being collected on the side walls of the filter bag. The air flow passes through the sides of the filter bags, generally designated as 23, and passes around hopper cone 22 to maintain it at an elevated temperature. Filter bags 23 are supported by and connected to a first means at their upper end, said means also defining with the upper end of shell 26 a first receiving chamber. Filter bags 23 are also connected at their lower end to a second means which encloses the carbon black collection hopper 22 across its uppermost portion.

While in the preferred embodiment of the invention a flow-through type of filter bag is used, the invention is suitable for use in the closed filter bag type of collector. It would be obvious to one skilled in the art to adapt the invention to an up-flow type of filter or collection system.

A flapper valve 24 may be provided in the clean gas outlet to provide a pulsating gas flow to dislodge the particles of black that accumulate on the inner surfaces of bags 23. A typical temperature for the effluent gas entering at dust inlet 21 is 500°–600° F., which has been found adequate to maintain the lower part of hopper cone 22 at approximately 400° F., which is well above the dew point of most carbon black reactor effluents.

Since there is no carbon black deposited in the interior of chamber 25, there is no caking of the carbon black on its interior walls and any condensate which does form thereon does not cause the serious corrosion problem previously discussed with respect to the interior of hopper cone 16. Outer shell 26 may or may not be insulated depending upon safety requirements in the particular locality.

In the preferred type of collector, an air lock 27 is provided between the hopper 22 and conveyor 28, as conveyor 28 operates at a different air pressure than the air pressure within hopper cone 22. The slope of hopper cone 22 is also preferably less than 30° from the vertical, as it has been found that most grades of carbon black will not adhere to a slope of less than 30° off the vertical, if temperature and moisture conditions are optimum.

Additionally, it is desired to maintain the temperature within the hopper 22 at above the ejection point of the particular grade of black being manufactured. Although this temperature varies, 400° is sufficient to eject the black and prevent formation of carbon black on the interior surface of cone 22.

The novel method in the present invention consists of passing the dust-laden effluent into a set of filter bags, withdrawing the clean gas from the exterior of the filter bags, collecting the carbon black from the filter bags in a collection hopper mounted below the filter bags, and passing the clean gas around the exterior of the collection hopper in direct heat exchange contact therewith to maintain it at an elevated temperature substantially in excess of the dew point of the atmosphere within the collection hopper.

The first primary advantage of the present invention lies in keeping the outlet hopper at an elevated temperature, near or above the ejection point of the grade of black being processed, thereby preventing the formation of a cake on the interior of hopper cone 22. The second primary advantage is that the elevated temperature of the filtered hot gas surrounding hopper 22 maintains the temperature of hopper 22 at a point well above the dew point of the gaseous effluent within hopper 22, thereby preventing the formation of condensate within the hopper. Thus, the length of time the collector will be able to operate without blocking up due to the formation of carbon black cake is remarkably increased, and the danger of losing the lower portion of the hopper cone from corrosion is substantially decreased. Furthermore, another distinct advantage is in the elimination of the bulky and expensive insualtion normally required over the entire exterior of the collection hopper, such insulation now being applied only at selected points where necessary for safety purposes.

What is claimed is:

1. A bag-type filtering device for separating solids from a hot gaseous effluent, comprising;
   (a) a completely enclosed upright exterior shell, said shell defining an inlet port at one end for receiving a hot gaseous effluent and further defining an exit port at the other end for the removal of clean gas,
   (b) a first means extending transversely and having at least one bag filter opening defined therein for directing the gaseous effluent into the filter bag and preventing any by-pass thereof, said means being mounted within said shell between the inlet and said outlet openings to define with an upper end of the shell, a receiving chamber to receive the hot gaseous effluent and solids suspended therein,
   (c) an upright collection hopper mounted within the shell at the lower end thereof for receiving said solids, said hopper being covered by a second means defining at least one bag filter opening therein, said hopper being mounted within and spaced apart from side walls of the shell, said collection hopper defining at the bottom thereof an outlet for removal of the collected carbon black, said exit port for the clean gas being located adjacent the lower end of the hopper,
   (d) at least one tubular and porous open-ended filter bag removably connected to the opening defined by the first means at its upper end and removably connected to the opening defined in said second means at its lower end, said filter bag connected to receive and filter the hot gaseous effluent as the effluent passes fom the first receiving chamber through said filter bag into said exterior shell to thereby surround the exterior of the collection hopper and maintain said collection hopper at a temperature above the point of the atmosphere contained therein.

2. A bag-type filtering device for separating solids from a hot gaseous effluent as claimed in claim 1, which further comprises a conveyor for removing said particles from said collection chamber and an air lock mounted between said conveyor and said collection hopper to isolate the air pressure maintained in said collection hopper from the air pressure maintained in said conveyor.

3. A bag-type filtering device for separating solids from a hot gaseous effluent as claimed in claim 1, wherein said collection chamber comprises an upright cone with a generally converging side wall and lower discharge opening.

4. A bag-type filtering device for separating solids from a hot gaseous effluent as claimed in claim 1, wherein said receiving chamber comprises a generally upright shell with said first means being horizontal and extending from shell wall to shell wall to define said receiving chamber.

5. A method for removing suspended carbon black from a hot gaseous effluent comprising;
   (a) feeding a hot gaseous effluent containing carbon black at a temperature of 250–800° F. through an inlet opening defined in a first receiving enclosure and subsequently into a plurality of porous filter bags that open into said enclosure,
   (b) withdrawing the hot gas through said filter bags to filter said carbon black and to remove it from said hot gas, said clean gas being withdrawn into a second enclosure mounted below said receiving enclosure, said second enclosure completely surrounding said filter bags and an enclosed collection hopper, said second enclosure further defining a clean gas outlet at the bottom thereof,
   (c) directing the filtered hot gas downwardly and in completely surrounding relation to an enclosed carbon black collection hopper, collecting carbon black in said collection hopper, said collection hopper defining an inlet in communication with said bag filters and further defining an outlet at the bottom for removal of the collected carbon black,
   (d) maintaining the temperature of the enclosed carbon black collection hopper above the dew point of the gases contained therein said temperature being at least 250° F. by surrounding said hopper with the filtered hot gas before withdrawing through the clean gas outlet whereby the formation of condensate on the interior walls of said collection hopper is prevented.

6. A method for removing suspended carbon black from a hot gaseous effluent as claimed in claim 5 which further comprises periodically interrupting the flow of said hot gas to provide a pulsed flow of gas through the filter bags, whereby the carbon black collected on the interior walls of said filter bags is dislodged by the sharp pulses of gas through said filter bags.

References Cited

UNITED STATES PATENTS 1,784,339  12/1930  Clasen et al. _____ 55—341

(Other references on following page)

References Cited

UNITED STATES PATENTS

| | | | |
|---|---|---|---|
| 1,797,812 | 3/1931 | Waring | 55—341 |
| 2,804,168 | 8/1957 | Church | 55—302 |
| 2,982,532 | 5/1961 | Hakes | 55—341 |
| 3,146,080 | 8/1964 | Ruble et al. | 55—96 |
| 3,388,534 | 6/1968 | Jensen | 55—302 |
| 3,411,929 | 11/1968 | Garrett | 55—341 |
| 3,423,906 | 1/1969 | Fried | 55—302 |

FOREIGN PATENTS 326,831    3/1903    France.

FRANK W. LUTTER, Primary Examiner

B. NOZICK, Assistant Examiner

U.S. Cl. X.R.

55—97, 288, 341